United States Patent
Toshiyoshi et al.

(10) Patent No.: US 7,825,755 B2
(45) Date of Patent: Nov. 2, 2010

(54) ELECTROSTATIC MICRO ACTUATOR, ELECTROSTATIC MICROACTUATOR APPARATUS AND DRIVING METHOD OF ELECTROSTATIC MICRO ACTUATOR

(75) Inventors: Hiroshi Toshiyoshi, Yokohama (JP); Hiroyuki Fujita, Tokyo (JP); Yuko Yamauchi, Atsugi (JP); Akio Higo, Tokyo (JP); Kuniyuki Kakushima, Yokohama (JP)

(73) Assignee: The Foundation for the Promotion of Industrial Science (JP)

( * ) Notice: Subject to any disclaimer, the term of this patent is extended or adjusted under 35 U.S.C. 154(b) by 643 days.

(21) Appl. No.: 11/577,965

(22) PCT Filed: Apr. 7, 2005

(86) PCT No.: PCT/JP2005/006861
§ 371 (c)(1),
(2), (4) Date: Apr. 25, 2007

(87) PCT Pub. No.: WO2006/046322
PCT Pub. Date: May 4, 2006

(65) Prior Publication Data
US 2009/0102006 A1    Apr. 23, 2009

(51) Int. Cl.
*H01H 51/22* (2006.01)
(52) U.S. Cl. .......................... 335/78; 200/181
(58) Field of Classification Search ............ 335/78; 200/181
See application file for complete search history.

(56) References Cited

U.S. PATENT DOCUMENTS 6,310,339 B1    10/2001    Hsue et al.
6,417,807 B1    7/2002    Hsu et al.
6,583,374 B2 *    6/2003    Knieser et al. .......... 200/181
2003/0162375 A1 *    8/2003    Chen et al. .............. 438/527

(Continued)

FOREIGN PATENT DOCUMENTS

JP    2001-102911    4/2001

(Continued)

OTHER PUBLICATIONS

Office Action issued Feb. 5, 2008 on the counterpart Japanese Patent Application No. 2004-316082 and the English Language Translation.

(Continued)

*Primary Examiner*—Elvin G Enad
*Assistant Examiner*—Bernard Rojas
(74) *Attorney, Agent, or Firm*—Ostrolenk Faber LLP

(57) ABSTRACT

A semiconductor substrate; a cantilever which is formed on the semiconductor substrate so as to face the semiconductor substrate with an air layer therebetween, the cantilever being made from an electrically conductive material or a semiconductor material, and the cantilever being mechanically movable; a photodiode which is formed so as to be connected in parallel to a capacitance that is constituted from the cantilever and the semiconductor substrate, and the photodiode being formed between an anchor portion which is a portion of the cantilever and the semiconductor substrate; and a power source which supplies voltage via a resistance on a side of the cantilever which is a connection point of a parallel circuit including both the capacitance and the photodiode so as to be backward bias to the photodiode, are included.

3 Claims, 18 Drawing Sheets

U.S. PATENT DOCUMENTS

2004/0061106 A1    4/2004  Kitagawa et al. .............. 257/40

FOREIGN PATENT DOCUMENTS

| JP | 2002-305844 | 10/2002 |
| JP | 2003-513411 | 4/2003 |
| JP | 2004-103559 | 4/2004 |
| JP | 2004-530369 | 9/2004 |
| WO | 02/089251 | 11/2002 |

OTHER PUBLICATIONS

Yuko Yamauchi (et al.), The Institute of Electrical Engineers of Japan Micromachine Sensor System Kenkyukai, MSS-04, Nos. 16 to 34, May 12, 2004, pp. 101-105.

David T. Amm and Robert W. Crrigan, "Optical Performance of the Grating Light Valve Technology", Photonics West-Electronic Imaging 1999.

E. Higurashi, R. Sawada, T.Ito, "Optically drivenangular alignment of microcomponents made of in-planebirefrigent polyimide film based on optical angular momentum transfer" J.OF Microeng. vol. 11(2), pp. 140-145, 2001.

S. Baglio, S. Castorina, L. Fortuna L.N. Savalli, "Modelingand design of novel photo-thermo-mechanical microactuators," Sensors and Actuators A101(1-2), pp. 185-193, 2002.

International Search Report PCT/JP2005/006861 dated Apr. 28, 2005,(Japanes Patent Office).

E. Higurashi, R. Sawada, T.Ito, "Optically driven angular alignment of microcomponents made of in-plane birefringent polyimide film based on optical angular momentum transfer" J. of Microeng. vol. 11(2), pp. 140-145, 2001.

S. Baglio, S. Castorina, L. Fortuna, N. Savalli, "Modelingand design of novel photo-thermo-mechanical microactuators," Sensors and Actuators A101(1-2), pp. 185-193, 2002.

\* cited by examiner

ELECTROSTATIC MICRO ACTUATOR, ELECTROSTATIC MICROACTUATOR APPARATUS AND DRIVING METHOD OF ELECTROSTATIC MICRO ACTUATOR

CROSS REFERENCE TO RELATED APPLICATION

The present application is a 35 U.S.C. §§371 national phase conversion of PCT/JP2005/006861, filed Apr. 7, 2005, which claims priority of Japanese Patent Application No.2004-316082, filed Oct. 29, 2004 which is herein incorporated by reference. The PCT International Application was published in the Japanese language.

TECHNICAL FIELD

The present invention relates to a semiconductor micromachining MEMS (Micro Electro Mechanical System), and especially relates to an electrostatic microactuator, an electrostatic microactuator apparatus, and a driving method of the electrostatic microactuator.

BACKGROUND ART

With respect to MEMS (Micro Electro Mechanical Systems), along with refining the structure size from a microstructure to a nano-structure, there is a tendency in which a drive energy supplying method with respect to a moving structure is a big problem.

In a MES structure of the prior art, as shown in the outlined figure of FIG. 14A, compared to the area of the moving mechanism, the size of the area shared by electric wiring for an electrostatic drive and a contact pad can be ignored; however, such as a variable grating of an Optical MEMS (David T. Amm and Robert W. Crrigan, "Optical Performance of the Grating Light Valve Technology", Photonics West-Electronic Imaging 1999), if the structure size is approximately the same as a wavelength which is applied (a few μm), as shown in outline diagrams of FIGS. 14B and 14C, an area shared by the electric wiring respectively connected to the MEMS moving structure portion is relatively large and this is a problem for designing a function (special light modulation of diffracted light, intensity modulation, and the like) of a device.

As a solution for solving the above described congestion problem of the wiring, a laser manipulation, or a method which uses Maxwell stress in an electromagnetic field of radiated light has been discussed in the past. For example, by using changes of momentum of light (light pressure) which is caused along with refraction and incidence of the light into a semitransparent small object for a driving force, a position control, a rotation control, and the like of the small object which is suspended in liquid are operated (E. Higurashi, R. Sawada, T. Ito, "Optically driven angular alignment of microcomponents made of in-plane birefringent polyimide film based on optical angular momentum transfer" J. OF Microeng. Vol. 11(2), pp. 140-145, 2001).

Moreover, a method of causing a displacement by converting radiated optical energy to heat and combining this with the bimorph effect of the micro structure (S. Baglio, S. Castorina, L. Fortuna L. N. Savalli, "Modeling and design of novel photo-thermo-mechanical microactuators," SENSORS AND ACTUATORS A101(1-2), pp. 185-193, 2002) is discussed as well.

However, compared to a conventional MEMS type electrostatic actuator to which a drive voltage can be arbitrarily set, the driving force generated from the light pressure or Maxwell force/stress of the light is very small; therefore, there is a problem in which it is difficult to simply replace the driving structure of the electrostatic actuator.

Moreover, with respect to the method of causing a displacement by converting radiated optical energy to heat and combining with the bimorph effect of the micro structure, a multiple layer structure is needed in an actuator portion; therefore, there is a problem in which the device structure is complex.

DISCLOSURE OF INVENTION

The present invention is made with respect to such the problems and has an object to provide an electrostatic microactuator, an electrostatic microactuator apparatus and a driving method of the electrostatic microactuator which can independently control a displacement of a fine mechanical structure (the moving structure portions of the electrostatic microactuator: elastic mechanical structure), which has a simple structure, and which does not cause a spatial congestion of the electric wiring.

SUMMARY OF THE INVENTION

In order to achieve the objects above, in the present invention, driving method of an electrostatic microactuator in which the electrostatic microactuator includes: an elastic mechanical structure which is arranged on a semiconductor substrate so as to face the semiconductor substrate, the elastic mechanical structure being made from an electrically conductive material or a semiconductor material and the elastic mechanical structure being mechanically movable; a capacitance which is constituted from the elastic mechanical structure and the semiconductor substrate; and a photodiode which is connected to the capacitance in series or in parallel, is the photodiode being formed on a portion of the elastic mechanical structure or between a portion of the elastic mechanical structure and the semiconductor substrate, wherein the elastic mechanical structure is mechanically displaced by changing a voltage applied to the capacitance, wherein the electrostatic microactuator driving method is characterized by a mechanical displacement of the elastic mechanical structure controlled by controlling the voltage applied to the capacitance based on whether or not light from outside exists or based on amount of the light.

In accordance with the driving method of the microactuator of the present application with the above described constitution, the voltage which is applied to the capacitance constituted from both the mechanically movable elastic mechanical structure and the conductive or semiconductor substrate is controlled in accordance with whether or not light coming into the photodiode exists or in accordance with amount of light, and therefore, a mechanical displacement of the elastic mechanical structure (movable structure portion) is controlled. In other words, an electrostatic attraction caused by the applied voltage is used as a driving source or an actuation power source of the electrostatic microactuator, and the applied voltage is controlled in accordance with whether or not light coming from outside exists or in accordance with amount of light. Therefore, it is possible for the user to arbitrarily set a higher driving voltage applied to the capacitance. Therefore, compared to a case in which a means such as a conventional laser manipulation or a light-heat conversion, it is possible to generate larger power.

The control is conducted by using the light. Therefore, it is possible to achieve a non-contact drive. Moreover, even if multiple electrostatic microactuators are formed on the same substrate, with respect to the electrical wiring, only a common wiring and a common earth are sufficient. Therefore, there is a special effect in which the electrical wiring becomes very easy and simplified.

Moreover, in the present invention, an electrostatic microactuator which is characterized by comprising: a semiconductor substrate; an elastic mechanical structure which is formed on the semiconductor substrate along with facing the semiconductor substrate with an air layer therebetween, the elastic mechanical structure is made from an electrically conductive material or a semiconductor material, and the elastic mechanical structure is mechanically movable; a photodiode which is connected in series or in parallel to a capacitance which is constituted from both the elastic mechanical structure and the semiconductor substrate, the photodiode being formed on a portion of the elastic mechanical structure or between a portion of the elastic mechanical structure and the semiconductor substrate; and a power source which supplies voltage in order to apply backward bias via a resistance to a side of the elastic mechanical structure which is a connection point of both the capacitance and the photodiode.

In accordance with the electrostatic microactuator of the above described constitution of the present invention, the voltage applied to the capacitance constituted from both the elastic mechanical structure and the semiconductor substrate is controlled by using outside light from the outside into the photodiode provided on a portion of the elastic mechanical structure or between the portion of the elastic mechanical structure and the semiconductor substrate. The mechanical displacement of the elastic mechanical structure which is a movable structure portion of the electrostatic microactuator is controlled in accordance with the voltage changes.

Therefore, it is possible for the user to arbitrarily set the applied driving voltage higher within the limit of the backward bias voltage of the photodiode; and compared to the case in which a means such as a conventional laser manipulation or a light-heat conversion is used, it is possible to generate larger power.

The control is conducted by using the light. Therefore, it is possible to achieve a non-contact drive. Moreover, even if multiple electrostatic microactuators are formed on the same substrate with respect to the electric wirings, only a common wiring and a common earth are sufficient. Therefore, there is an especial effect in which the electric wiring becomes very easy and simplified.

Moreover, in the present invention, an electrostatic microactuator which is characterized by comprising: a semiconductor substrate; an elastic mechanical structure which is formed on the semiconductor substrate along with facing the semiconductor substrate with an air layer therebetween, the elastic mechanical structure being made from an electrically conductive material or a semiconductor material, and the elastic mechanical structure being mechanically movable; a photodiode which is connected in parallel to a capacitance which is constituted from both the elastic mechanical structure and the semiconductor substrate, and the photodiode being formed between a portion of the elastic mechanical structure and the semiconductor substrate; and a power source which supplies voltage in order to apply backward bias via a resistance to a side of the elastic mechanical structure which is a connection point of both the capacitance and the photodiode.

In accordance with the electrostatic microactuator of the above described constitution of the present invention, the voltage applied to the capacitance constituted from both the elastic mechanical structure and the semiconductor substrate is controlled by using outside light from the outside into the photodiode provided between the portion of the elastic mechanical structure and the semiconductor substrate, and the mechanical displacement of the elastic mechanical structure which is a movable structure portion of the electrostatic microactuator is controlled in accordance with the voltage changes.

Therefore, it is possible for the user to arbitrarily set the applied driving voltage higher and compared to the case in which a means such as a conventional laser manipulation or a light-heat conversion is used, it is possible to generate larger power.

The control is conducted by using the light; therefore, it is possible to achieve a non-contact drive. Moreover, even if multiple electrostatic microactuators are formed on the same substrate with respect to the electric wirings, only a common wiring and a common earth are sufficient. Therefore, there is a special effect in which the electrical wiring becomes very easy and simplified.

Moreover, in the present invention, an electrostatic microactuator which is characterized by comprising: a semiconductor substrate; an elastic mechanical structure which is formed on the semiconductor substrate along with facing the semiconductor substrate with an air layer therebetween, the elastic mechanical structure being made from an electrically conductive material or a semiconductor material, and the elastic mechanical structure being mechanically movable; a photodiode which is connected in series to a capacitance which is constituted from both the elastic mechanical structure and the semiconductor substrate, and the photodiode being formed on a portion of the elastic mechanical structure; and a power source which supplies voltage in order to apply backward bias via a resistance to a side of the elastic mechanical structure which is a connection point of both the capacitance and the photodiode.

In accordance with the electrostatic microactuator of the above described constitution of the present invention, the voltage applied to the capacitance constituted from both the elastic mechanical structure and the semiconductor substrate is controlled by using outside light from the outside into the photodiode provided on a portion of the elastic mechanical structure, and the mechanical displacement of the elastic mechanical structure which is a movable structure portion of the electrostatic microactuator is controlled in accordance with the voltage changes.

Therefore, it is possible for the user to arbitrarily set the applied driving voltage higher; and compared to the case in which a means such as a conventional laser manipulation or a light-heat conversion is used, it is possible to generate larger power.

The control is conducted by using the light. Therefore, it is possible to achieve a non-contact drive. Moreover, even if multiple electrostatic microactuators are formed on the same substrate with respect to the electrical wiring, only a common wiring and a common earth are sufficient. Therefore, there is an especial effect in which the electrical wiring becomes very easy and simplified. It is possible to produce a mechanical structure portion (the semiconductor substrate and the elastic mechanical structure portion) of the electrostatic microactuator by using a SOI (Silicon-On-Insulator) substrate. Therefore, it is possible to increase a photoelectric conversion efficiency of the photodiode provided on the substrate and to increase a dielectric strength of the photodiode.

Moreover, in the present invention, an electrostatic microactuator apparatus which is characterized by comprising: a single semiconductor substrate; a plurality of elastic mechanical structures which are formed on the semiconductor substrate along with facing the semiconductor substrate with an air layer therebetween, the plurality of elastic mechanical structures being made from an electrically conductive material or a semiconductor material, and the plurality of elastic mechanical structures being mechanically movable; a plurality of photodiodes which is connected in parallel to a plurality of capacitances which are constituted from both the plurality of elastic mechanical structures and the semiconductor substrate, and the plurality of photodiodes being each formed between a portion of the elastic mechanical structure and the semiconductor substrate; and a power source which supplies voltage in order to apply backward bias via a resistance to a side of the elastic mechanical structures which are connection points of both the plurality of capacitances and the plurality of photodiodes.

In accordance with the electrostatic microactuator of the above described constitution, the voltage applied to the capacitance constituted from both the elastic mechanical structure and the semiconductor substrate is controlled by using outside light from the outside into the photodiode provided between a portion of the elastic mechanical structure and the semiconductor substrate, and the multiple electrostatic microactuators, in which the mechanical displacement of the elastic mechanical structure which is a movable structure portion is controlled in accordance with the voltage changes, are provided on a single semiconductor substrate and are driven by using a common power source. Therefore, it is possible to avoid congestion of the electric wirings and to independently control displacement of the movable structure portion of the electrostatic microactuator.

As described above, in accordance with the present invention, in the case in which multiple electrostatic microactuators are provided on the single substrate, by using beam (multiple) which propagates in a free space for driving the fine mechanical structure (elastic mechanical structure), it is possible to avoid spatial congestion of the electrical wiring and to independently control a displacement of the fine mechanical structure.

Moreover, in the present invention, light is used for conducting the drive control of the electrostatic microactuator; therefore, it is possible to obtain robustness or strength with respect to electromagnetic noise.

DESCRIPTION OF A PREFERRED EMBODIMENT

Hereinafter, a best mode for carrying out the present invention is explained with reference to the figures. It should be noted that the present invention is not limited by following embodiments, and, for example, it is possible to combine constitutional elements of the embodiments appropriately.

Figure 1A:
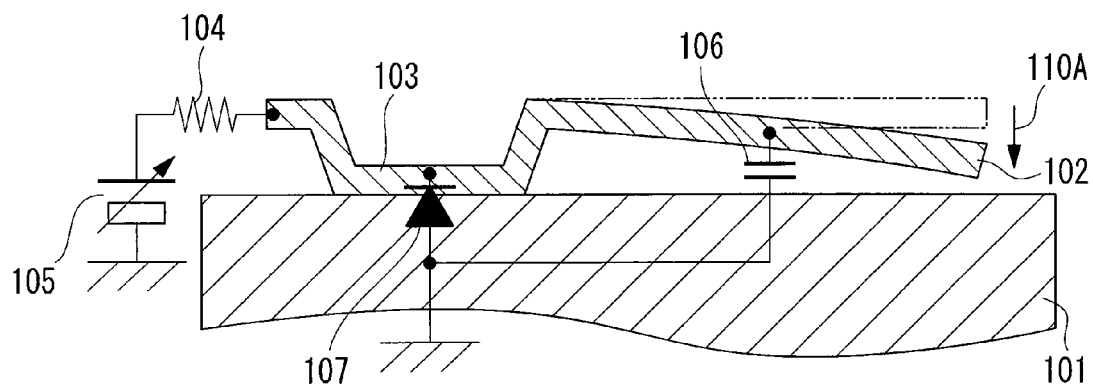
FIG. 1A is a figure showing a constitution of an electrostatic microactuator of a first embodiment of the present invention.
Figure 1B:
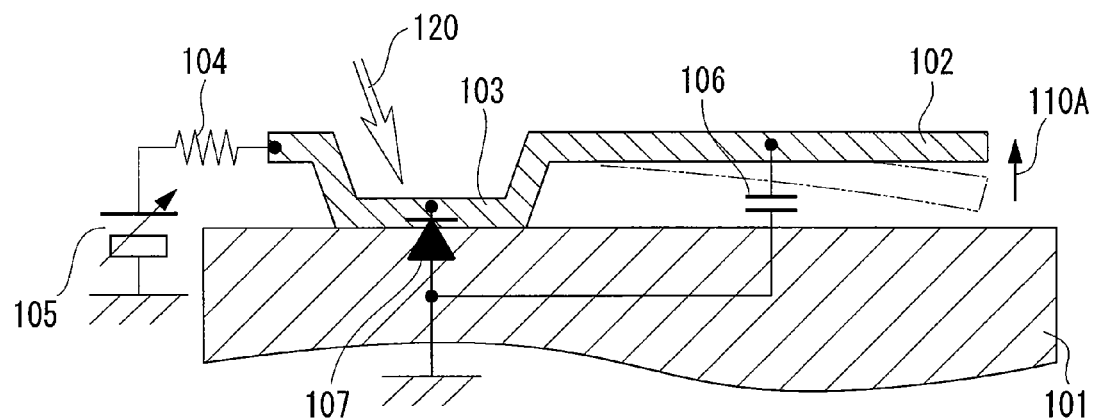
FIG. 1B is a figure showing a constitution of the electrostatic microactuator of the first embodiment of the present invention.

Hereinafter, an embodiment of the present invention is explained in detail with reference to the figures. A constitution of the electrostatic microactuator of a first embodiment of the present invention is shown in FIG. 1A and FIG. 1B. The electrostatic microactuator of the first embodiment of the present invention includes: a semiconductor substrate 101; a cantilever (movable structure portion) 102 which is formed on the semiconductor substrate 101 so as to face the semiconductor substrate 101 with an air layer between, which is made from an electrically conductive material or a semiconductor material, and which is a mechanically movable elastic mechanical structure; a photodiode 107 which is formed so as to be parallel-connected to a capacitance 106 that is constituted from the cantilever 102 and the semiconductor substrate 101, and which is formed between an anchor portion 103 that is a portion of the cantilever 102 and the semiconductor substrate 101; and a power source 105 which applies voltage via a resistance 104 on a side of the cantilever 102 that is a connection point of a parallel circuit including both the capacitance 106 and the photodiode 107 so as to be backward bias to the photodiode 107.

Here, in the first embodiment, the cantilever is used as an elastic mechanical structure. However, this is not a limitation of the present invention. For example, a beam or a torsion beam can be applied, and in other words, a structure which can be mechanically displaced upon receiving an external force can be applied. This point is same in other embodiments.

The semiconductor substrate is, for example, a silicon substrate, and the cantilever 102 is, for example, made from polycrystalline silicon which is an electrically conductive material. Production methods of mechanical structure portions of the electrostatic microactuator of the first embodiment are described later.

Figure 2:
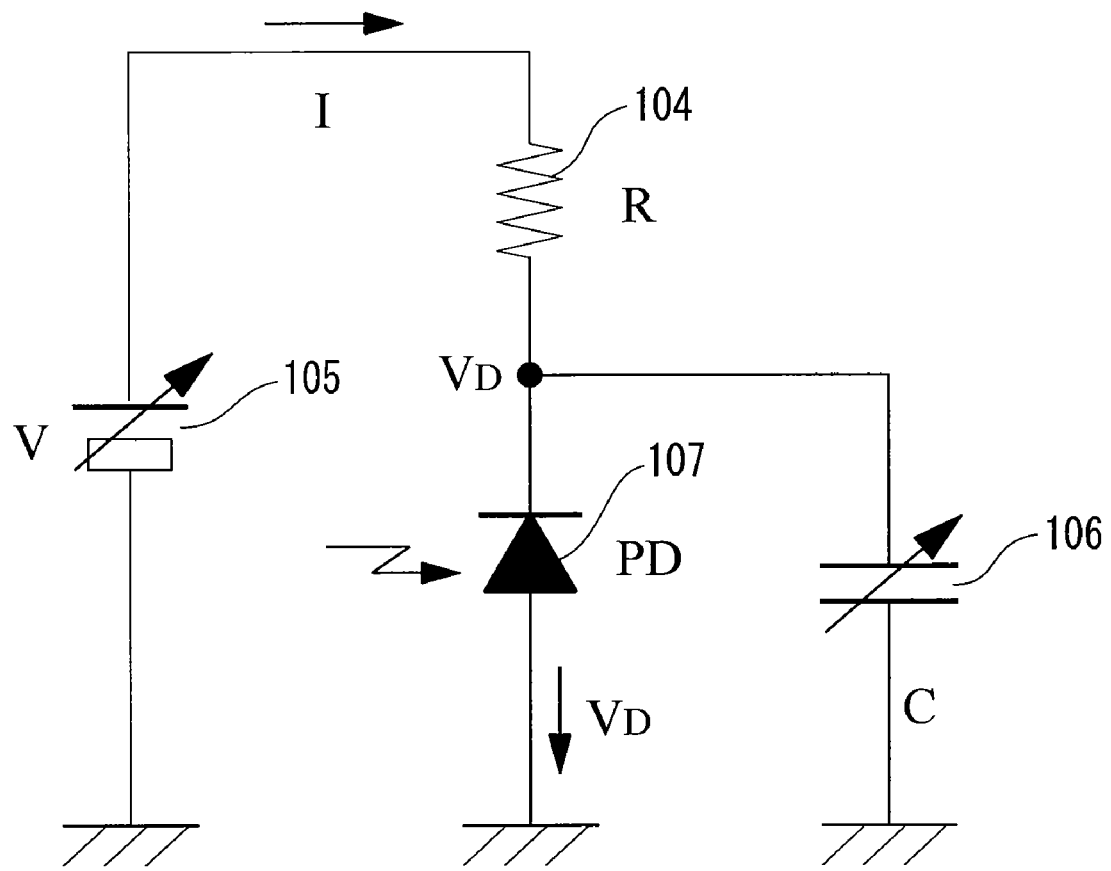
FIG. 2 is a circuit diagram showing an equivalent circuit of the electrostatic microactuator of the first embodiment of the present invention shown in FIG. 1.

FIG. 2 shows an equivalent circuit of the electrostatic microactuator shown in FIG. 1A and FIG. 1B. As shown in the same figure, the photodiode 107 (PD) is parallel-connected to the capacitance 106 that is constituted from the cantilever 102 and the semiconductor substrate 101, and an anode of the photodiode 107 (PD) is connected to the ground. The power source 105 (power source voltage is V) is connected to a connection point D (a cathode side of the photodiode 107) of the cantilever 102 side of the parallel circuit which includes the capacitance 106 (capacitance value is C) and the photodiode 107, via the resistance 104 (value of resistance is R) so as to apply a backward bias to the photodiode 107.

It is known that when a voltage is applied to the capacitance 106 which is constituted from the cantilever 102 and the semiconductor substrate 101, an electrostatic attraction affects on both the cantilever 102 and the semiconductor substrate 101 which constitute the capacitance. Therefore, by changing the voltage applied to the capacitance, it is possible to control the mechanical displacement of the cantilever 102 which is a movable structure portion of the microactuator and which is an elastic mechanical structure. It should be noted that the resistance 104 is externally provided in this embodiment. However, it is possible to provide the resistance 104 as an internal resistance of a portion that connects both the photodiode 107 at the anchor portion 103 of the cantilever 102 and the power source 105.

Figure 3:
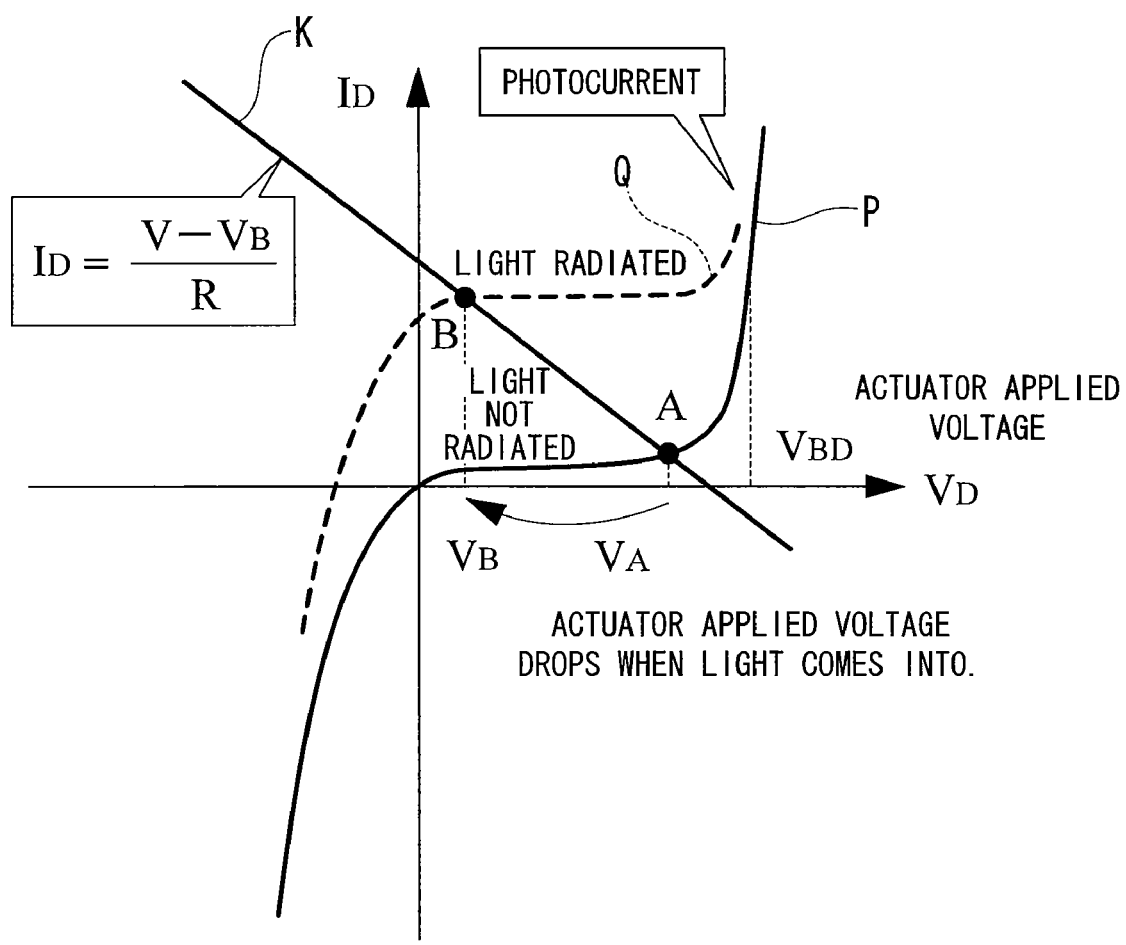
FIG. 3 is a figure showing a driving characteristic of the electrostatic microactuator of the first embodiment of the present invention shown in FIG. 1.

FIG. 3 shows a driving characteristic of the electrostatic microactuator. FIG. 3 is a characteristic figure which shows a relationship between an actuator applied voltage (driving voltage), which is applied to the capacitance 106 constituted from both the cantilever 102 that is an elastic mechanical structure and the semiconductor substrate 101, and an photocurrent ID flowing at the photodiode 107.

An operation of the electrostatic microactuator of the first embodiment of the present invention that has the above-described constitution is explained. In FIG. 3, a curve P shows a voltage-current characteristic of the photodiode 107 in a state in which the light is not coming onto an interface of a PN junction of the photodiode 107, a curve Q shows a voltage-current characteristic of the photodiode 107 in a state in which the light is coming onto an interface of the PN junction, and K is a load line. Moreover, VBD is a backward bias breakdown voltage of the PN junction, and in this embodiment (the same in other embodiments as well), the actuator applied voltage (driving voltage) VD is set to be sufficiently higher than the voltage drop of the PN junction and to be lower than the backward bias breakdown voltage VBD of the PN junction.

In the above-described constitution, in a state in which the light is not directed or shining onto an interface of a PN junction of the photodiode 107 which is provided on the anchor portion 103 of the cantilever 102, in the equivalent circuit of FIG. 2, almost no photoelectricity flows at the photodiode 107. Therefore, a voltage VA which is an intersection of both the load line K and the curve P and which is the actuator applied voltage VD is applied between both edges of the capacitance 106. This voltage VA is a voltage value close to the power source voltage V of the power source 105.

At this time, an electrostatic attraction is caused between the cantilever 102 and the semiconductor substrate 101 that constitute the capacitance 106. As a result, the elastic mechanism structure 102 is drawn to a side of the semiconductor substrate 101 in accordance with an arrow 110 and is displaced as shown in FIG. 1A.

When light 120 which is control light comes onto an interface of a PN junction of the photodiode 107 which is provided on the anchor portion 103 of the cantilever 102, in FIG. 2, photoelectricity flows at the photodiode 107. Therefore, a voltage drop is caused at the resistance 104, and the voltage VB which corresponds to the amount of the dropped voltage of the photodiode 107, which is at an intersection of both the curve Q and the load line K and which is an actuator applied voltage VD is applied between both ends of the capacitance 106.

In accordance with such steps, just a small amount of voltage is applied between both ends of the capacitance 106. Therefore, an electrostatic attraction is not caused between the cantilever 102 and the semiconductor substrate 101 that constitute the capacitance 106. As shown in FIG. 1B, the cantilever 106 displaces to a direction 110A for being apart from the semiconductor substrate 101 and is released or removed.

In such the manner, a control light 120 that is radiated on the PN junction of the photodiode 107 from outside is controlled along with keeping the actuator applied voltage (driving voltage) VD at a fixed level, that is, it is controlled whether or not the control light 120, or amount of light of the control light 120 is controlled. Therefore, it is possible to control the mechanical displacement of the cantilever 102 as the elastic mechanical structure which is a movable structure portion of the electrostatic microactuator.

In other words, in accordance with the electrostatic microactuator of the first embodiment of the present invention, a voltage value applied to the capacitance constituted from the elastic mechanical structure and the semiconductor substrate is controlled based on outside light from the outside into the photodiode provided between a portion of the elastic mechanical structure and the semiconductor substrate, and the mechanical displacement of the elastic mechanical structure which is a movable structure portion of the electrostatic microactuator is controlled based on the voltage changes. Therefore, it is possible for an user to set the driving voltage as high as he or she wants within the limit of the photodiode's reverse breakdown voltage, and compared to conventional cases in which means such as a laser micro manipulation, a light-heat conversion, or the like is applied, it is possible to make the generated power larger.

Moreover, it is controlled by using the light. Therefore, it is possible to achieve a non-contact drive. Furthermore, even when multiple electrostatic microactuators are provided on the same substrate, the common power source and the common ground connection are sufficient as the electrical wiring. Therefore, there is a special advantageous effect in which the electrical wiring is significantly simple.

Figure 4A:
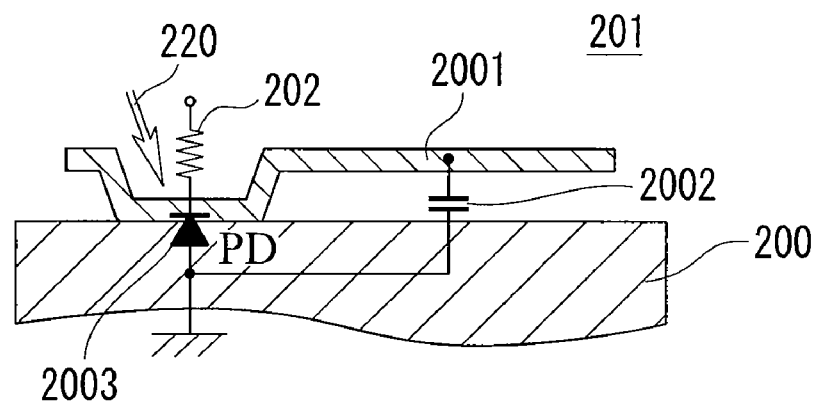
FIG. 4A is a figure showing a constitution of the electrostatic microactuator apparatus which is constituted from multiple electrostatic microactuators of the first embodiment of the present invention shown in FIG. 1A and FIG. 1B provided on a single semiconductor substrate.
Figure 4B:
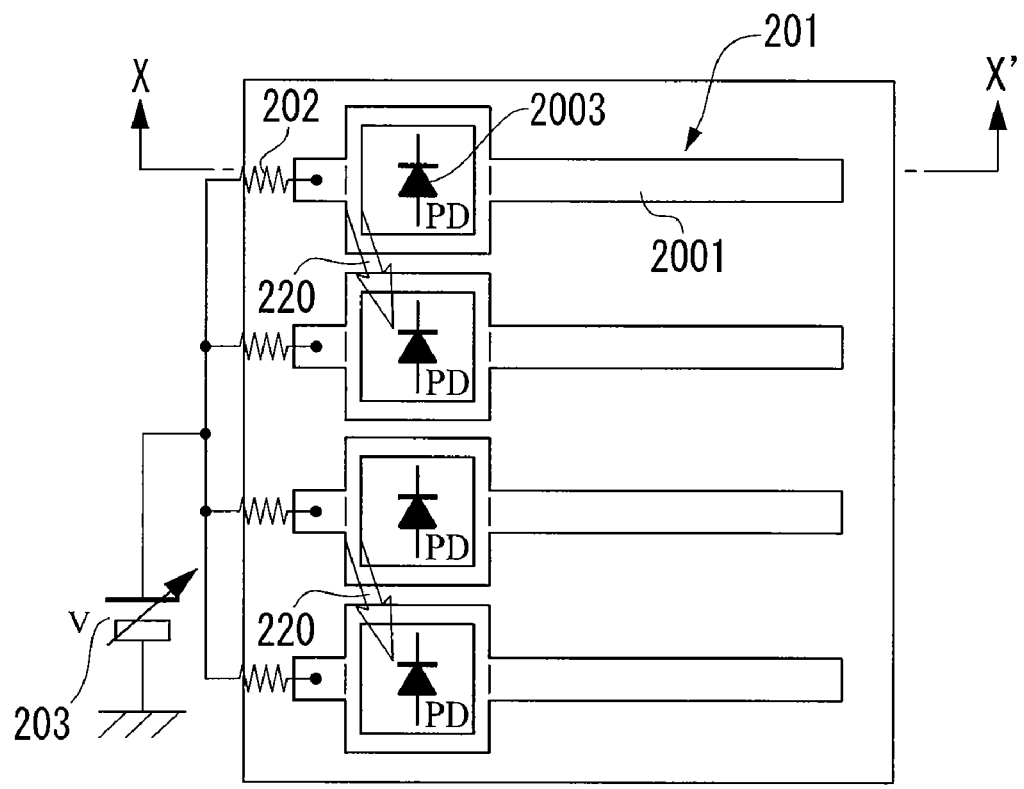
FIG. 4B is a figure showing a constitution of the electrostatic microactuator apparatus which is constituted from multiple electrostatic microactuators of the first embodiment of the present invention shown in FIG. 1A and FIG. 1B provided on a single semiconductor substrate.

FIG. 4A and FIG. 4B show a constitution of the electrostatic microactuator of an embodiment of the present invention obtained by providing the multiple electrostatic microactuators of the first embodiment of the present invention on a single semiconductor substrate shown in both FIG. 1A and FIG. 1B, FIG. 4B is a plane figure of the same, and FIG. 4A is a cross section of FIG. 4B by using a cut line X-X'.

In FIG. 4A and FIG. 4B, the electrostatic microactuator apparatus of this embodiment of the present invention includes: a single semiconductor substrate 200; a cantilever 2001 which is arranged on the semiconductor substrate 200 so as to face onto the semiconductor substrate 200 with an air layer therebetween, which is made from an electrically conductive material or a semiconductor material, and which is mechanically movable and has multiple elastic mechanical structures; multiple photodiodes 2003 which are provided between a portion of the multiple cantilevers 2001 and the semiconductor substrate 200 so as to be connected in parallel to multiple capacitances 200 which are constituted from both these multiple cantilevers and the semiconductor substrate 200; and a power source 203 which applies voltage via a resistance 202 to one side of the cantilevers 2001 that is a connection point of a parallel circuit of both the multiple capacitances 2002 and the photodiodes 2003 so as to be backward bias to each of the photodiodes 2003.

In other words, an elastic mechanical structure (movable mechanical structure) is made from an electrically conductive material such as polycrystalline silicon on a silicon substrate as a single semiconductor substrate. A single electrostatic microactuator is obtained by constituting a PN junction of the photodiode at its anchor portion, and multiple sets of such a constitution of the electrostatic microactuator are provided in parallel on a single silicon substrate. A connection point of a side of the elastic mechanical structure of a parallel circuit including both a capacitance and a photodiode of each of the electrostatic microactuator is connected to a single power source 203 so as to apply a backward bias voltage on each of the photodiode via a resistance.

It is relatively easy to constitute or realize a structure of a single electrostatic microactuator, and moreover, even in a case in which multiple electrostatic microactuators are provided in parallel on a single semiconductor substrate, it is not necessary to provide the respective wiring. One common power source line is sufficient.

With respect to the design structure of the electrostatic microactuator, the following points should be considered:

(1) the voltage needed to drive the electrostatic microactuator should be sufficiently higher than the voltage drop of the PN junction;

(2) the voltage needed to drive the electrostatic microactuator should be lower than the backward bias breakdown voltage;

(3) the resistance value R of the resistance 202 and a photocurrent I of the photodiode 2003 are obtained so as to be sufficiently large because the dynamic range of the voltage applied on the capacitance of the electrostatic microactuator is determined in accordance with the amount of dropped voltage which is determined based on R and I; and moreover, (4) the cutoff frequency of driving is determined in accordance with the resistance value R of the resistance 202 and a capacity C of the capacitance 2002.

Figure 5:
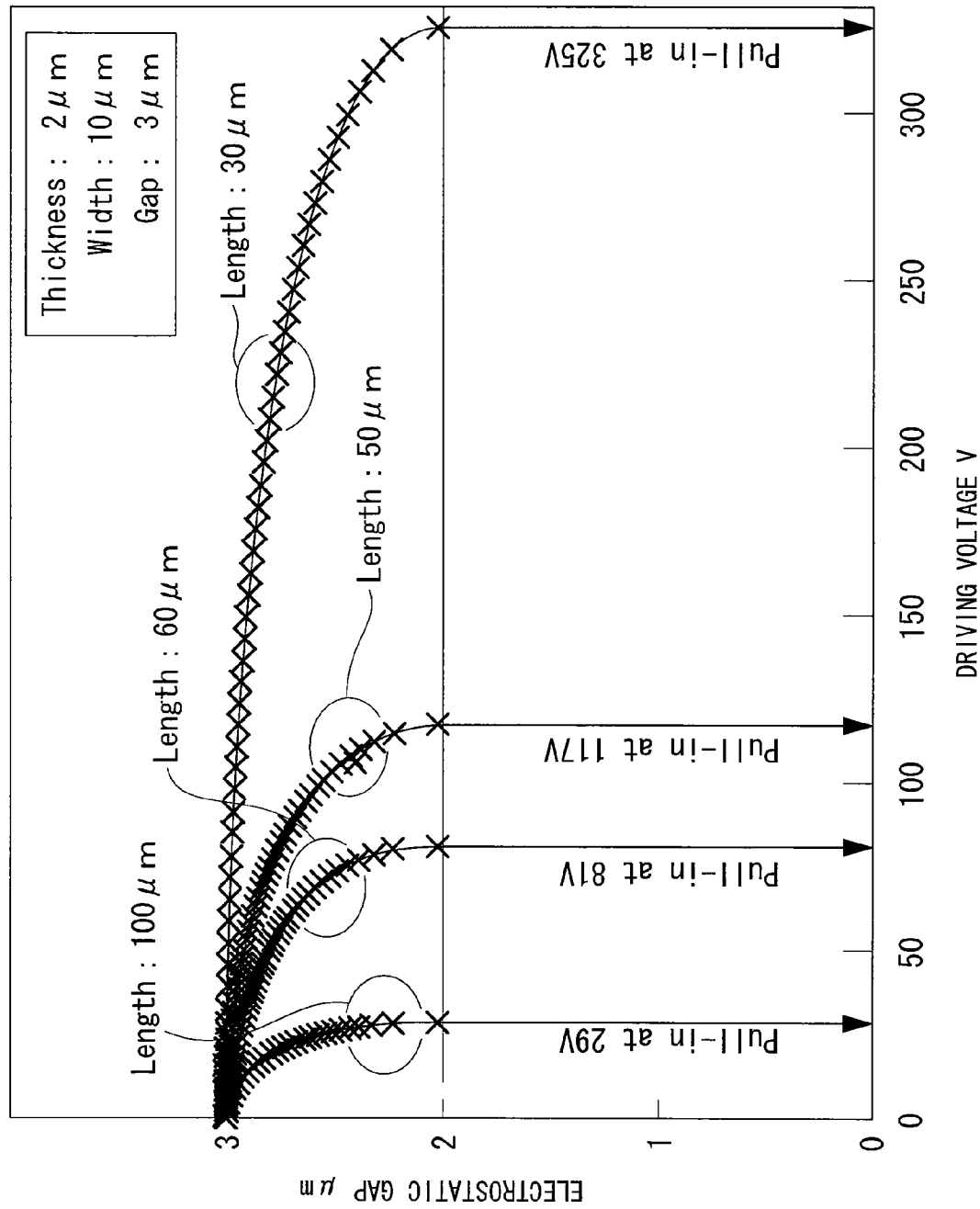
FIG. 5 is a characteristic figure showing a calculation result obtained by conducting a numerical calculation based on the drive voltage-displacement of the electrostatic microactuator of the first embodiment of the present invention.

In FIG. 5, a numerical calculation result of a voltage-displacement characteristic of a cantilever (elastic mechanical structure) type electrostatic microactuator (electrostatic gap 3 μm, width 10 μm, thickness 2 μm, length 20-100 μm) made from silicon is shown regardless of the concentration of the electric field. It should be noted that along with driving, there is a distribution of size of electrostatic gaps in a direction from a root to a top of the cantilever which is an elastic mechanical structure of the electrostatic microactuator. Therefore, a differential equation with respect to curving the lever which receives distributed load is calculated. As a result, a pull-in voltage at approximately ⅔ of the initial gap is obtained in a range of 29-81 V by calculation when the length of the cantilever is in a range of 60-100 μm. The backward breakdown voltage of the silicon PIN junction photodiode sold at a market is 30-80 V. Therefore, design is conducted in this voltage range.

In accordance with the electrostatic microactuator apparatus of the above described constitution of the embodiment of the present invention, the voltage applied to the capacitance constituted from both the elastic mechanical structure and the semiconductor substrate is controlled by using the outside light from the outside into the photodiode provided between a portion of the elastic mechanical structure and the semiconductor substrate. The multiple electrostatic microactuators, in which the mechanical displacement of the elastic mechanical structure which is a movable structure portion is controlled in accordance with the voltage changes, are provided on a single semiconductor substrate and are driven by using a common power source. Therefore, it is possible to simplify the electrical wiring to avoid congestion of the electrical wiring and to independently control a displacement of the movable structure portion of the electrostatic microactuator by using light without a contact.

FIG. 6A-6D show an example of a production step of a mechanical structure portion of the electrostatic microactuator of the first embodiment of the present invention. In FIG. 6A-6D, after depositing a $SiO_2$ layer 251 on a p-type silicon substrate 250 so as to be a predetermined thickness in accordance with CVD method, a window 252 for providing both the photodiode and the anchor portion of the cantilever which is an elastic mechanical structure of the electrostatic microactuator is opened or pierced on the $SiO_2$ layer 251 (FIG. 6A) by applying photolithography processes and etching processes.

Figure 6A:
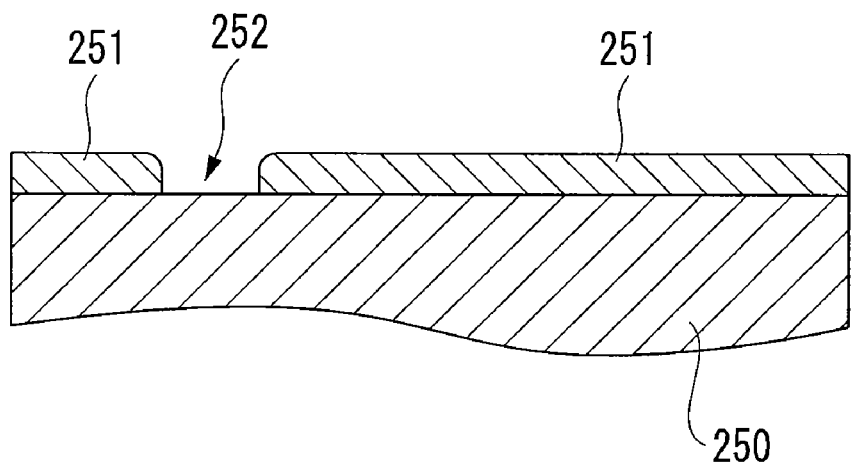
FIG. 6A is an explanation figure showing an example of a production step of a structure of a mechanical structure portion of the electrostatic microactuator of the first embodiment of the present invention.
Figure 6B:
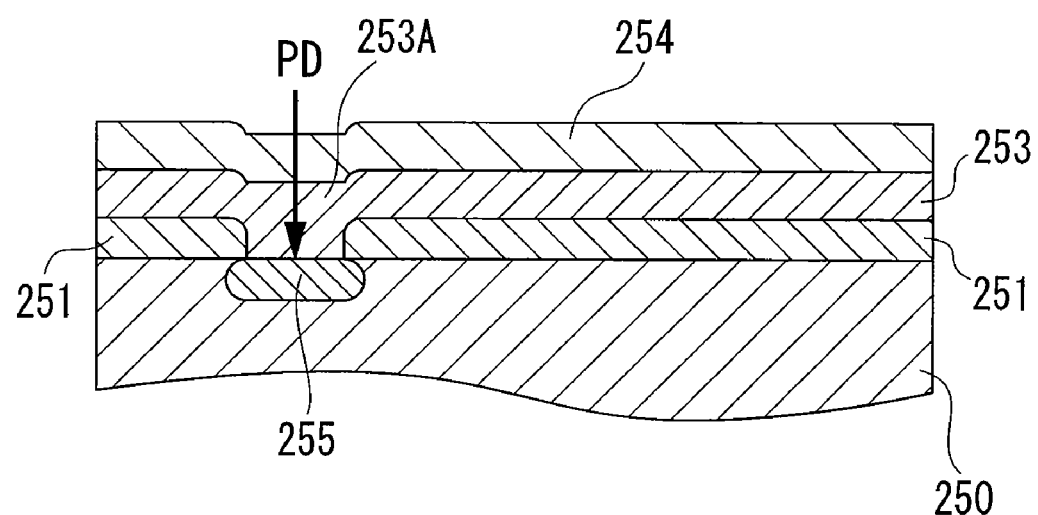
FIG. 6B is an explanation figure showing an example of a production step of a structure of a mechanical structure portion of the electrostatic microactuator of the first embodiment of the present invention.

After depositing a polycrystalline silicon layer 253 so as to be a predetermined thickness in accordance with CVD method, a flattening operation is conducted. Moreover, a coating for forming a $SiO_2$ covering layer 254 including phosphorous (P) is deposited so as to be a predetermined thickness in accordance with LPCVD method. As a result, phosphorus (P) included in the coating for forming the $SiO_2$ covering layer 254 is thermally diffused on a surface layer of the p-type silicon substrate 250 at a lower portion of the polycrystalline silicon layer 253A which is deposited at the window 252, and an n-type layer 255 is formed. Therefore, a PN junction of the photodiode is formed from both the n-type layer 255 and a p-type area of the p-type silicon substrate 250 adjacent to the n-type layer 255 (FIG. 6B).

Figure 6C:
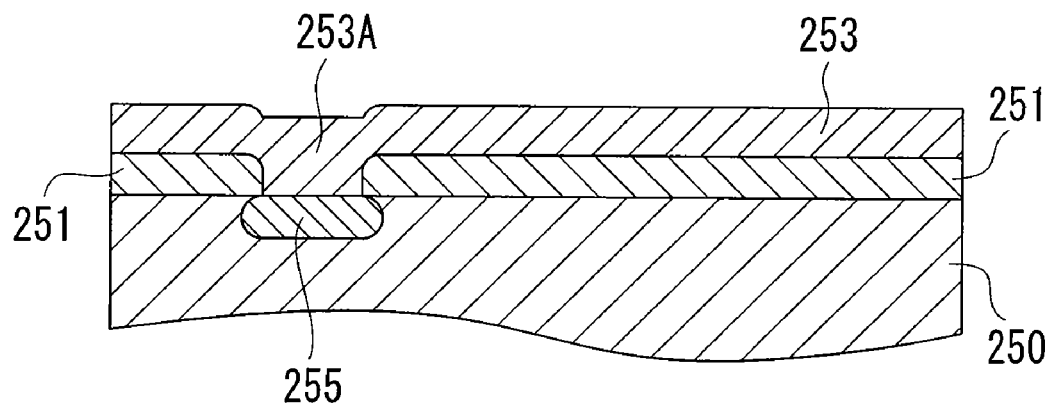
FIG. 6C is an explanation figure showing an example of a production step of a structure of a mechanical structure portion of the electrostatic microactuator of the first embodiment of the present invention.

After removing the coating for forming the $SiO_2$ covering layer 254, a masking is conducted by using a photoresist. Then an etching for forming the polycrystalline silicon layer 253 is conducted so as to be in a shape of the cantilever (elastic mechanical structure), and the photoresist is removed (FIG. 6C).

Figure 6D:
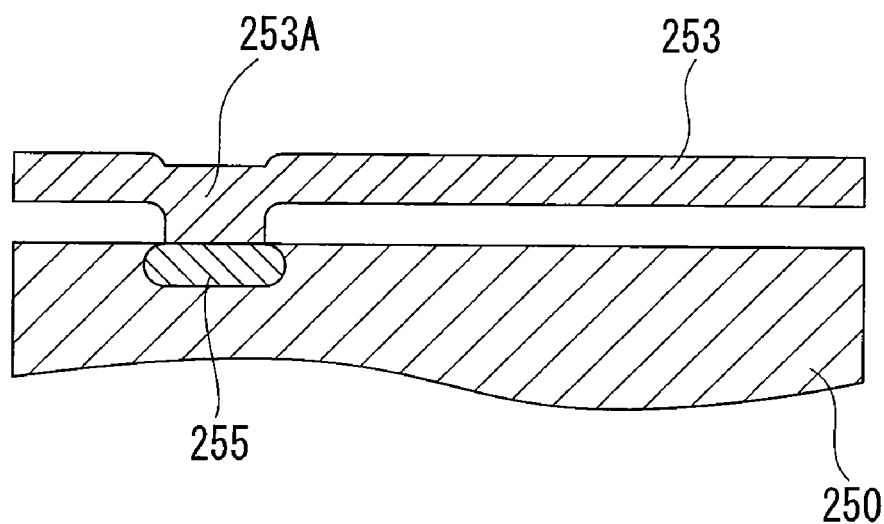
FIG. 6D is an explanation figure showing an example of a production step of a structure of a mechanical structure portion of the electrostatic microactuator of the first embodiment of the present invention.

By removing the $SiO_2$ layer 251, it is possible to obtain a structure of a mechanical structure portion including the cantilever of the electrostatic microactuator (FIG. 6D). In a practical case, at the anchor portion of the cantilever, a contact pad for wirings is formed. However, its process is omitted because of convenience of explanation.

Figure 7:
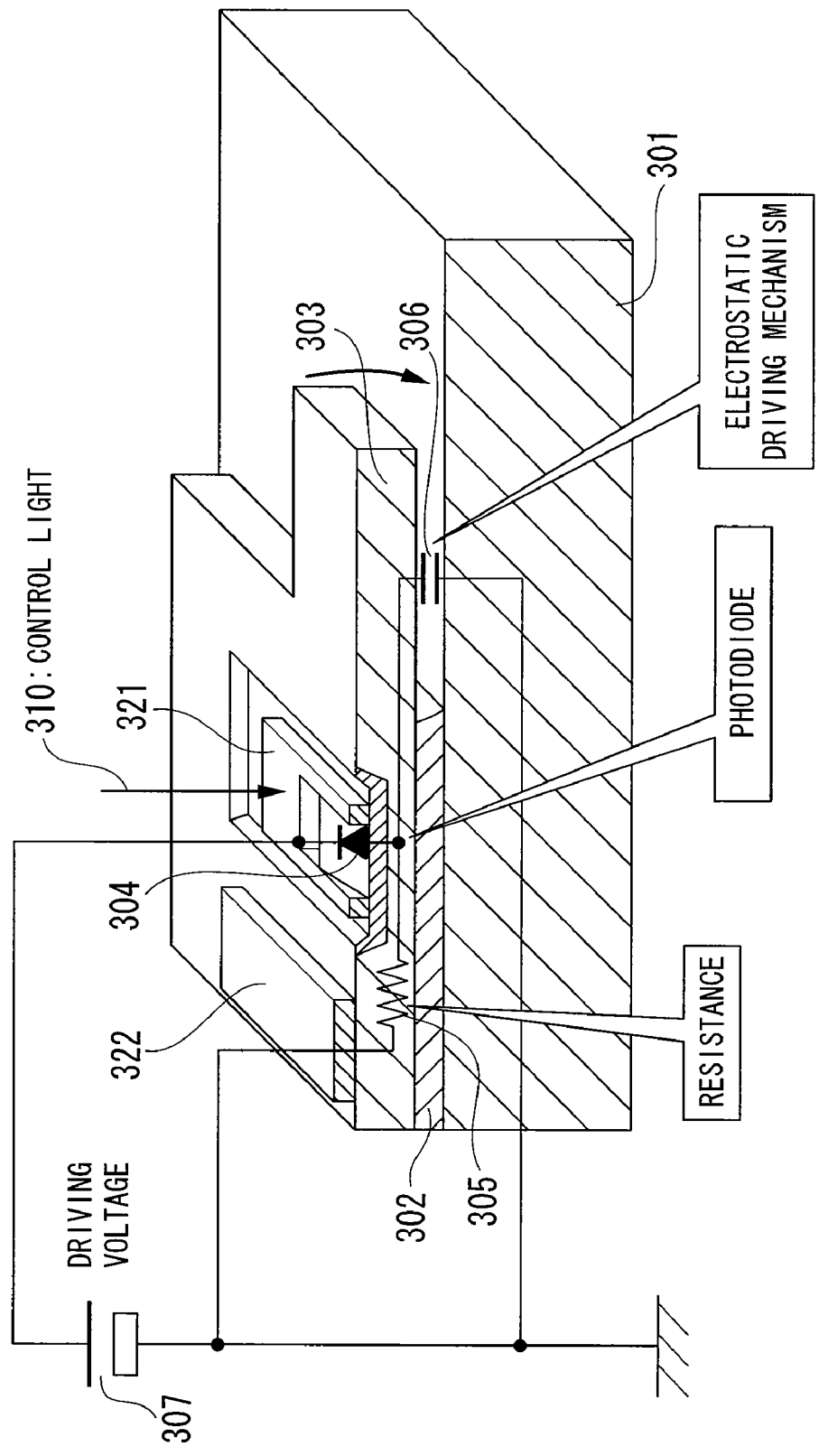
FIG. 7 is a figure seen from an oblique angle which shows an external constitution of an electrostatic microactuator of a second embodiment of the present invention.

FIG. 7 shows an external constitution of the electrostatic microactuator of the second embodiment of the present invention. In this figure, the electrostatic microactuator apparatus of this embodiment of the present invention includes: a semiconductor substrate 301; a cantilever 303 which is arranged on the semiconductor substrate 301 so as to face the semiconductor substrate 301, which is made from an electrically conductive material or a semiconductor material, and which is mechanically movable, elastic and mechanical structure; a photodiode 304 which is provided at an anchor portion that is a portion of the cantilevers 303 so as to be serially-connected to a capacitance 306 which is constituted from both the cantilever and the semiconductor substrate 301; and a power source 307 which applies voltage via a resistance 305 on a side of the cantilever 303 that is a connection point of both the capacitance 306 and the photodiode 304 so as to be backward bias to the photodiode 304. The resistance 305 is an internal resistance of the anchor portion of the cantilever 303.

The semiconductor substrate 301 is a silicon substrate in this embodiment, and the cantilever 303 is formed with a different silicon layer which is formed along with putting an insulation layer 302 such as an oxide film between them. It is possible to produce the cantilever 303 of the semiconductor substrate 301 by using an SOI (Silicon-On-Insulator) substrate.

A contact pad 321 is formed on a cathode of the photodiode 304, and a contact pad 322 is formed on an area divided from an area on which the contact pad 321 of the anchor portion of the cantilever 303 is formed.

A production method of a mechanical structure portion of the electrostatic microactuator of the second embodiment is explained below.

Figure 9:
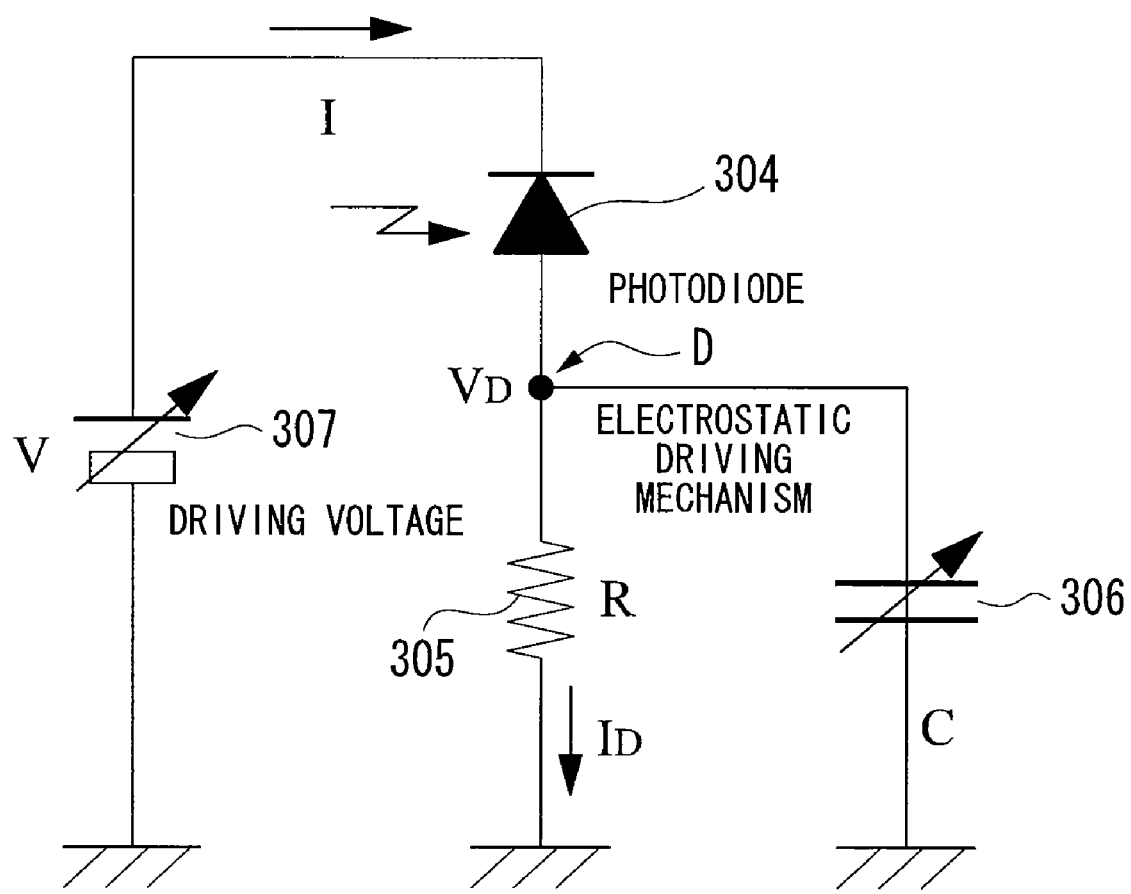
FIG. 9 is a circuit diagram showing an equivalent circuit of the electrostatic microactuator of the second embodiment of the present invention shown in FIG. 7.

FIG. 9 shows an equivalent circuit of the electrostatic microactuator shown in FIG. 7. As shown in the same figure, one end of the capacitance 306 (capacitance value is C) that is constituted from the cantilever 303 and the semiconductor substrate 301 is connected to ground. An anode of the photodiode 304 (PD) is serially-connected to another end of the capacitance 306, and a cathode side of the photodiode 107 is connected to a side of a positive electrode of the power source 307 (power source voltage is V) via the contact pad 321.

The anode of the photodiode 107 is connected to a negative electrode of the power source 307 via both the resistance 305 (resistance value is R) and the contact pad 322, and the negative electrode of the power source 307 is connected to ground. In such a manner, connections of the wirings are arranged so as to apply backward bias to the photodiode 304 from the power source 307 via the resistance 305. It should be noted that a connection point between the photodiode 304 and the capacitance 306 is D, and the electric potential of this point is VD.

Figure 8A:
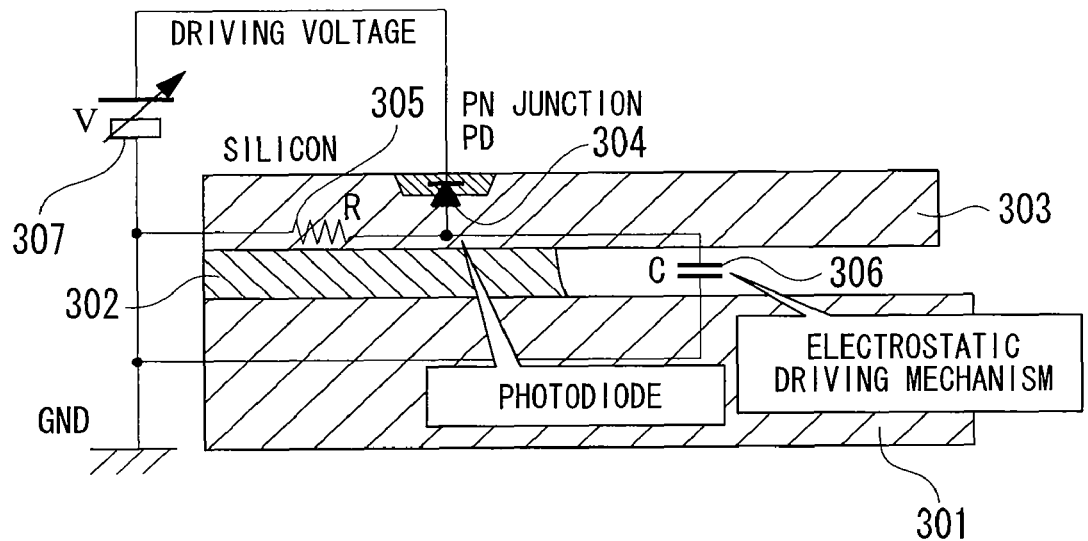
FIG. 8A is an explanation figure showing an operation or activation state of the electrostatic microactuator of the second embodiment of the present invention.
Figure 8B:
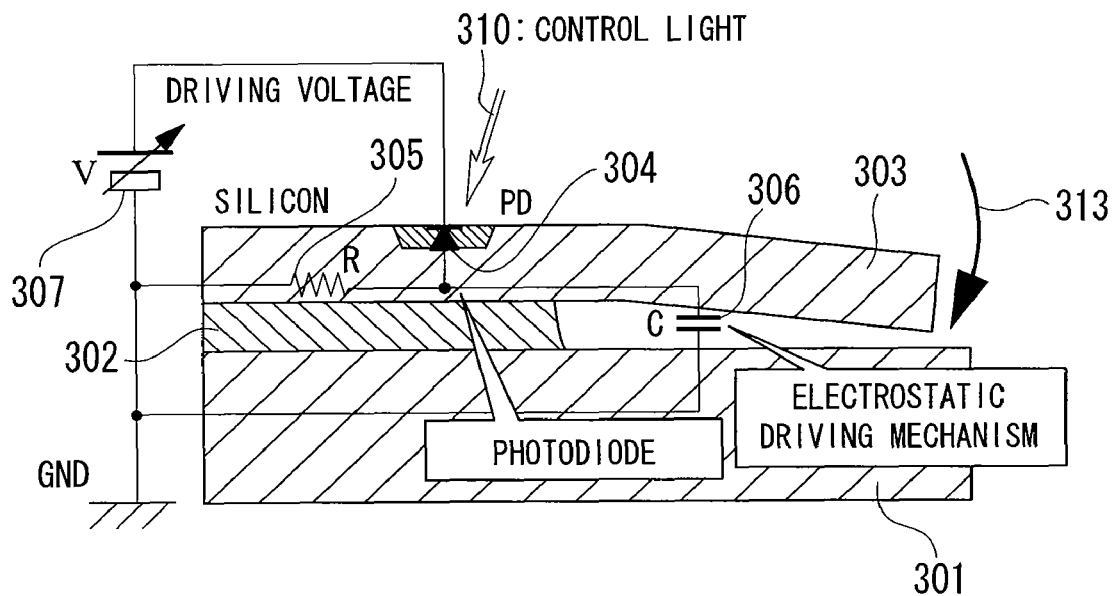
FIG. 8B is an explanation figure showing an operation or activation state of the electrostatic microactuator of the second embodiment of the present invention.

An operation of the electrostatic microactuator of the second embodiment in accordance with the above described constitution is explained in reference to FIGS. 8A and 8B. FIGS. 8A and 8B show an operation state or activation state of the electrostatic microactuator shown in FIG. 7, and the contact pads 321 and 322 are omitted for convenience of explanation.

In the above described constitution, as shown in FIG. 8A, in a state in which the light (operation light) 310 does not interfer with the PN junction of the photodiode 304 which is provided at the anchor portion of the cantilever 303, in the equivalent circuit in FIG. 9, almost no photocurrent I flows at the photodiode 304. Therefore, a voltage between both ends of the capacitance 106, in other words, an electric potential of the point D which is the actuator applied voltage VD, is almost same as the ground potential.

Therefore, in this state, almost no electrostatic attraction occurs on the cantilever 303 which forms the capacitance 306 and the semiconductor substrate 301, and there is no displacement for the cantilever 303.

As shown in FIG. 8B, if the control light 310 comes into the interface of the PN junction of the photodiode 304 which is provided at the anchor portion of the cantilever 303, in FIG. 8B, the photocurrent I flows at the photodiode 304 Therefore, a voltage which is lower than the power source voltage V cut to decrease of the voltage of the photodiode 107 is applied between the both ends of the capacitance 306 as the actuator applied voltage VD.

At this time, electrostatic attraction occurs at both the cantilever 303 and the semiconductor substrate 301 which constitute the capacitance 306. Therefore, as a result, the cantilever displaces to a direction of an arrow 313.

In such a manner, in accordance with the electrostatic microactuator of the second embodiment of the present invention and the same as the electrostatic microactuator of the first embodiment, the control light 310 radiated on the PN junction of the photodiode 304 from outside is controlled along with keeping the actuator applied voltage (driving voltage) VD at a fixed level. That is, it is controlled regardless of the presence of the control light 310 which comes into, or amount of light of the control light 310 is controlled; therefore, it is possible to control the mechanical displacement of the cantilever 303 as the elastic mechanical structure which is a movable structure portion of the electrostatic microactuator.

Figure 10A:
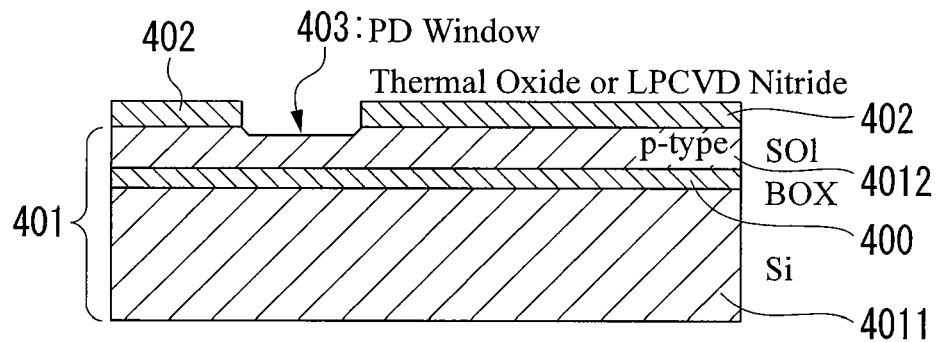
FIG. 10A is an explanation figure showing an example of a production step of the structure of a mechanical structure portion of the electrostatic microactuator of the second embodiment of the present invention.

FIGS. 10A-10F show examples of production steps of a mechanical structure portion of the electrostatic microactuator of the second embodiment of the present invention. In the same figure, an insulating layer 402 is deposited so as to be a predetermined thickness in accordance with the CVD method or the LPCVD method on a p-type silicon layer 4012 of a SOI (Silicon-On-Insulator) substrate 401 which provides a buried oxide film layer (Buried Oxide, BOX) 400, and after that, a window 403 is opened or pierced on the insulating layer 402 in order to provide a photodiode by using a photolithography process and an etching process (FIG. 10A).

Figure 10B:
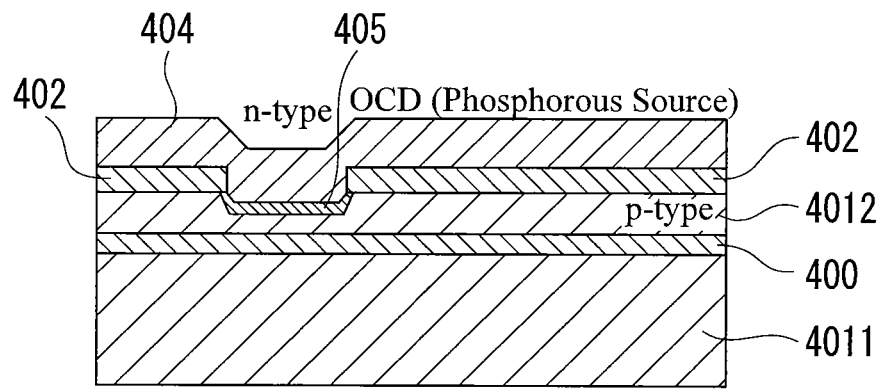
FIG. 10B is an explanation figure showing an example of a production step of the structure of a mechanical structure portion of the electrostatic microactuator of the second embodiment of the present invention.
Figure 10C:
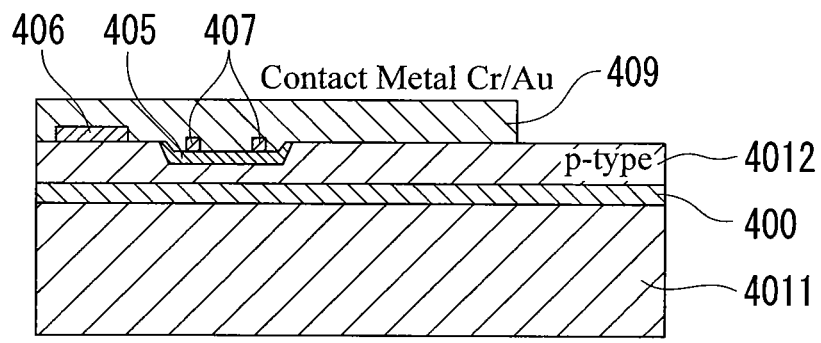
FIG. 10C is an explanation figure showing an example of a production step of the structure of a mechanical structure portion of the electrostatic microactuator of the second embodiment of the present invention.
Figure 10D:
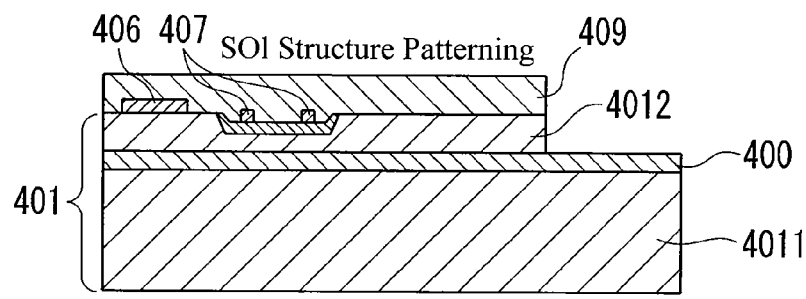
FIG. 10D is an explanation figure showing an example of a production step of the structure of a mechanical structure portion of the electrostatic microactuator of the second embodiment of the present invention.

In accordance with the LPCVD method, a coating for forming the $SiO_2$ covering layer 404 including phosphorous (P) is deposited so as to be a predetermined thickness. As a result, the included phosphorus (P) is thermally diffused on a surface layer of the p-type silicon substrate 4012 at a lower portion of the coating for forming SiO2 covering layer 404 which is deposited at the window 403, and an n-type layer 405 is formed. Therefore, a PN junction of the photodiode is formed from both the n-type layer 405 and a p-type area of the p-type silicon substrate 4012 adjacent to the n-type layer 405 (FIG. 10B).

After removing the coating for forming the $SiO_2$ covering layer 404 and the insulating layer 402, a metal layer is deposited by using chromium (Cr)/gold (Au). Then, a patterning is conducted, and contact pads 406/407 and a mirror 408 are formed. On them, a resist layer 409 is formed which has the function of a mask (FIG. 10C) in order to form a cantilever as an elastic mechanical structure of the electrostatic microactuator on the silicon substrate 4011.

A portion which is not covered by the resist layer by using the resist layer 409 as a mask is removed by conducting an etching operation on the surface of the buried oxide film layer 400.

Figure 10E:
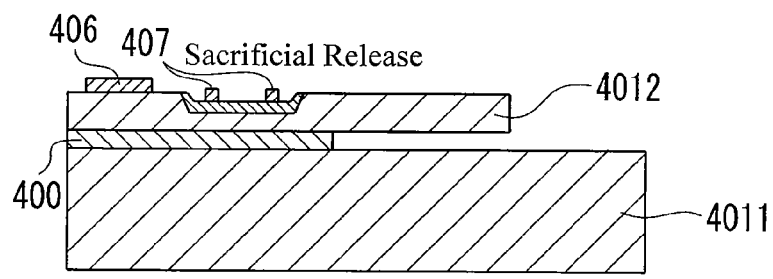
FIG. 10E is an explanation figure showing an example of a production step of the structure of a mechanical structure portion of the electrostatic microactuator of the second embodiment of the present invention.

Moreover, the resist layer 409 is removed and the buried oxide film layer 400 is selectively removed so as to separate the structure which is the mechanical structure portion of the electrostatic microactuator (FIG. 10E).

Figure 10F:
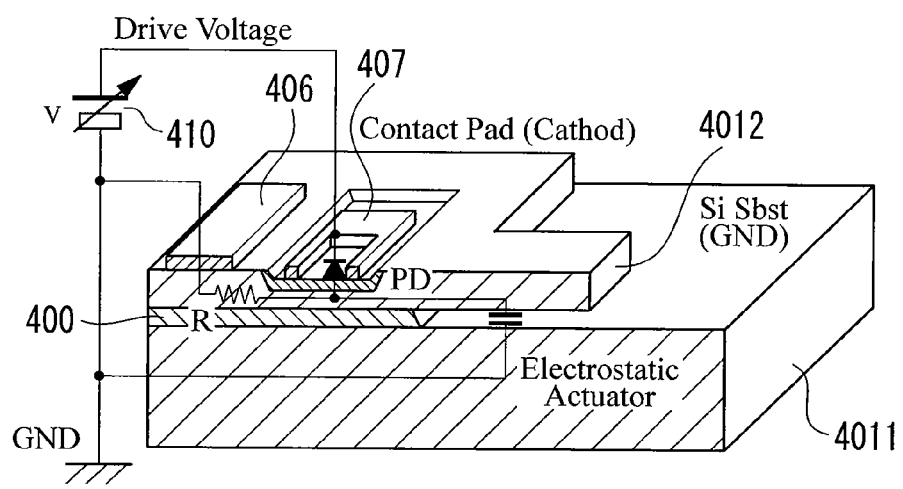
FIG. 10F is an explanation figure showing an example of a production step of the structure of a mechanical structure portion of the electrostatic microactuator of the second embodiment of the present invention.

Both the contact pads 406 and 407 and the power source 410 of the structure completed in such a manner are connected, and the electrostatic microactuator of the second embodiment of the present invention is completed (FIG. 10F).

The electrostatic microactuator of the second embodiment of the present invention was experimentally produced.

Figure 11A:
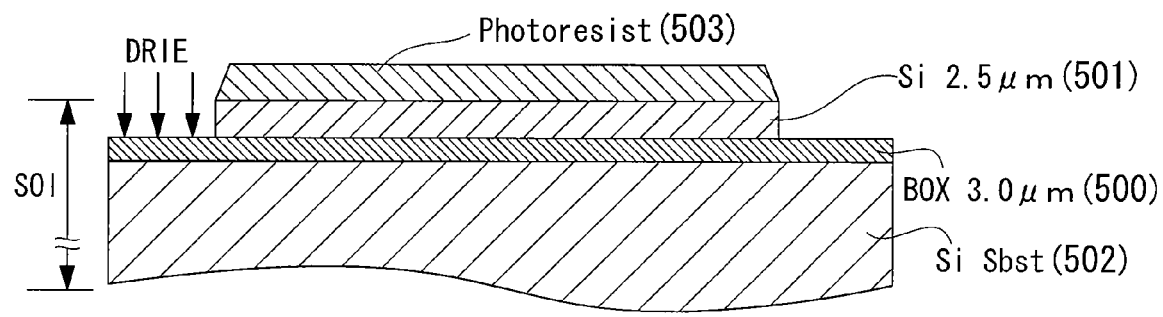
FIG. 11A is an explanation figure showing an example of a production step of the structure of a mechanical portion structure which is a trial manufacture of the electrostatic microactuator of the second embodiment of the present invention.
Figure 11B:
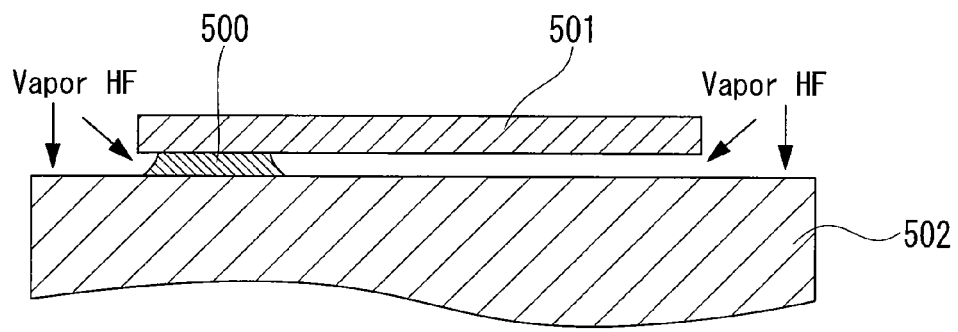
FIG. 11B is an explanation figure showing an example of a production step of the structure of a mechanical portion structure which is a trial manufacture of the electrostatic microactuator of the second embodiment of the present invention.
Figure 11C:
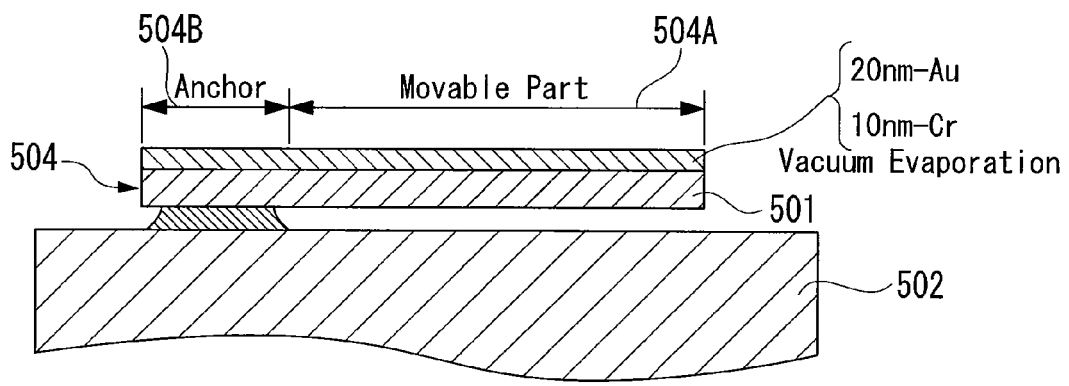
FIG. 11C is an explanation figure showing an example of a production step of the structure of a mechanical portion structure which is a trial or prototype of the electrostatic microactuator of the second embodiment of the present invention.

In this experimental production, in order to verify the principle of a light assist electrostatic actuation, the photodiode and the resistance were externally provided, and a cantilever/bridge structure which is the mechanical structure portion of the electrostatic microactuator was produced in accordance with processes shown in FIGS. 11A-11C. In the processes, a bonded SOI (Silicon on Insulator) substrate was used which is obtained by bonding both a substrate which is constituted from a 2.5 μm thick silicon layer 501 and a 3.0 μm thick buried oxide film layer (Buried Oxide, BOX) 500 and a silicon substrate 502.

First, a resist pattern 503 was formed by applying commonly used lithography and was printed on the silicon layer 501 (FIG. 11A) by using an STS Deep RIE apparatus made by SUMITOMO PRECISION PRODUCTS, Co Ltd. Next, the buried oxide film layer 500 which is a base is selectively removed and the cantilever/bridge structure was separated. It should be noted that, in order to prevent the separated micro structure from sticking to the substrate again, an oxide film was removed by applying hydrofluoric acid vapor (Vapor HF) (FIG. 11B). Finally, as an adhesive layer of wire bonding, a 10 nm chrome layer and a 20 nm gold layer were deposited on the overall surface of the substrate by applying vacuum evaporation.

Figure 12:
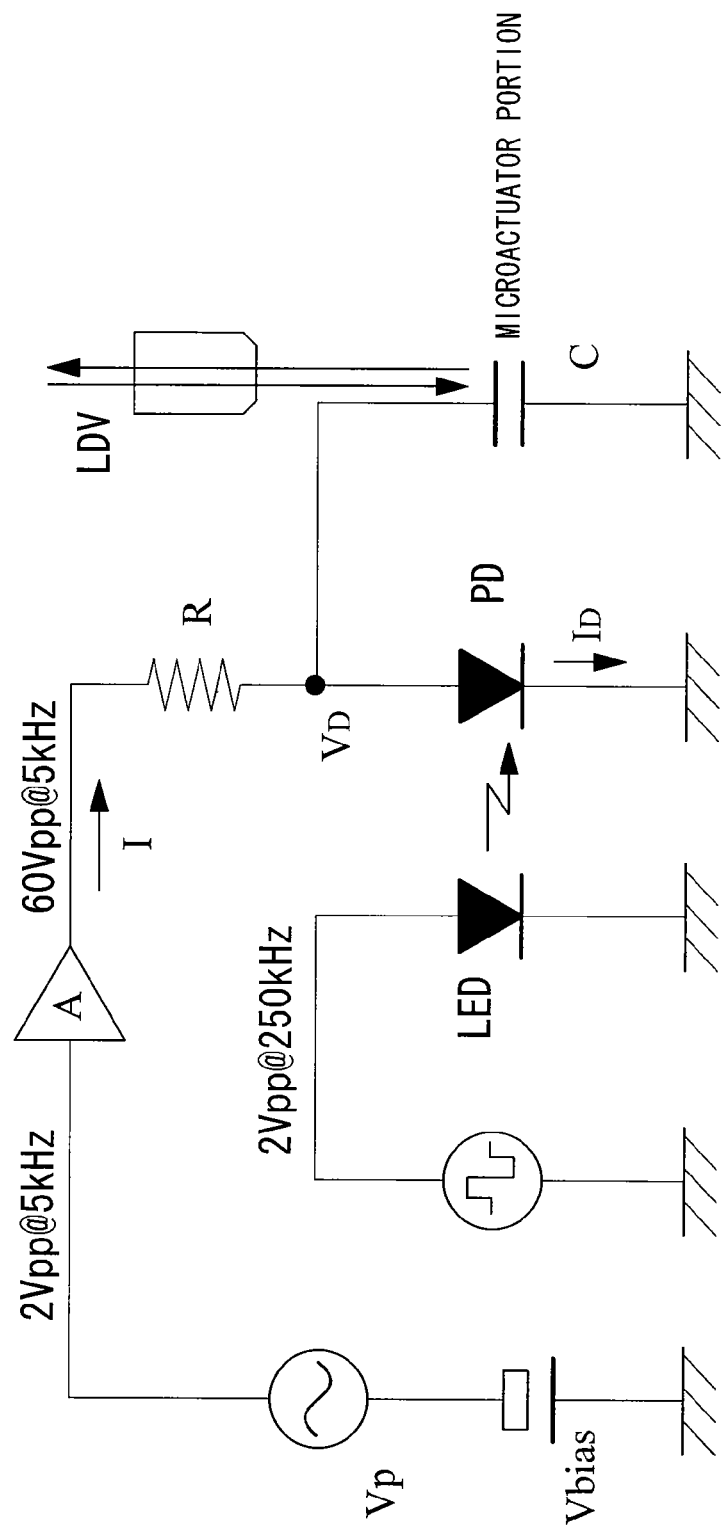
FIG. 12 is a figure showing a circuit constitution for an experiment aimed to confirm a theory of the prototype of the electrostatic microactuator.

The experimentally produced micro structure (micro mechanical structure) which is the mechanical structure portion of the electrostatic microactuator was arranged in the setup shown in FIG. 12, and the experiment was conducted. An external resistance R which has 1/4 W and 39 kO was applied, and a photodiode PD which is parallel to the actuator (capacitance C) and which was S1223-01 made by Hamamatsu Photonics K.K. (sensitivity center wavelength is 960 nm) was applied. In order to distinctly observe a state in which the actuator stops actuating when the light was radiated, an external driving voltage was applied which was obtained by amplifying a sine wave alternating current voltage with offset voltage (2Vpp+1Vdc, 5 kHz) so as to be 0-60V by using an amplifier.

A light emission diode LED (GL380 made by SHARP CORPORATION, emission center wavelength 950 nm, 11 mW) was applied in front of the photodiode and was driven with a square wave of 250 Hz and 5V, and that was the incident light. In other words, a pair of the photodiode PD and the light emission diode LED has a function as a photo coupler. In order to measure the displacement of the MEMS movable structure (cantilever/bridge structure), that is, a movable structure portion (elastic mechanical structure) of the electrostatic microactuator, a laser Doppler displacement meter made by Nihon Kogaku CORPORATION (MDL-103, measurement resolving power 1 nm) was used.

Figure 13:
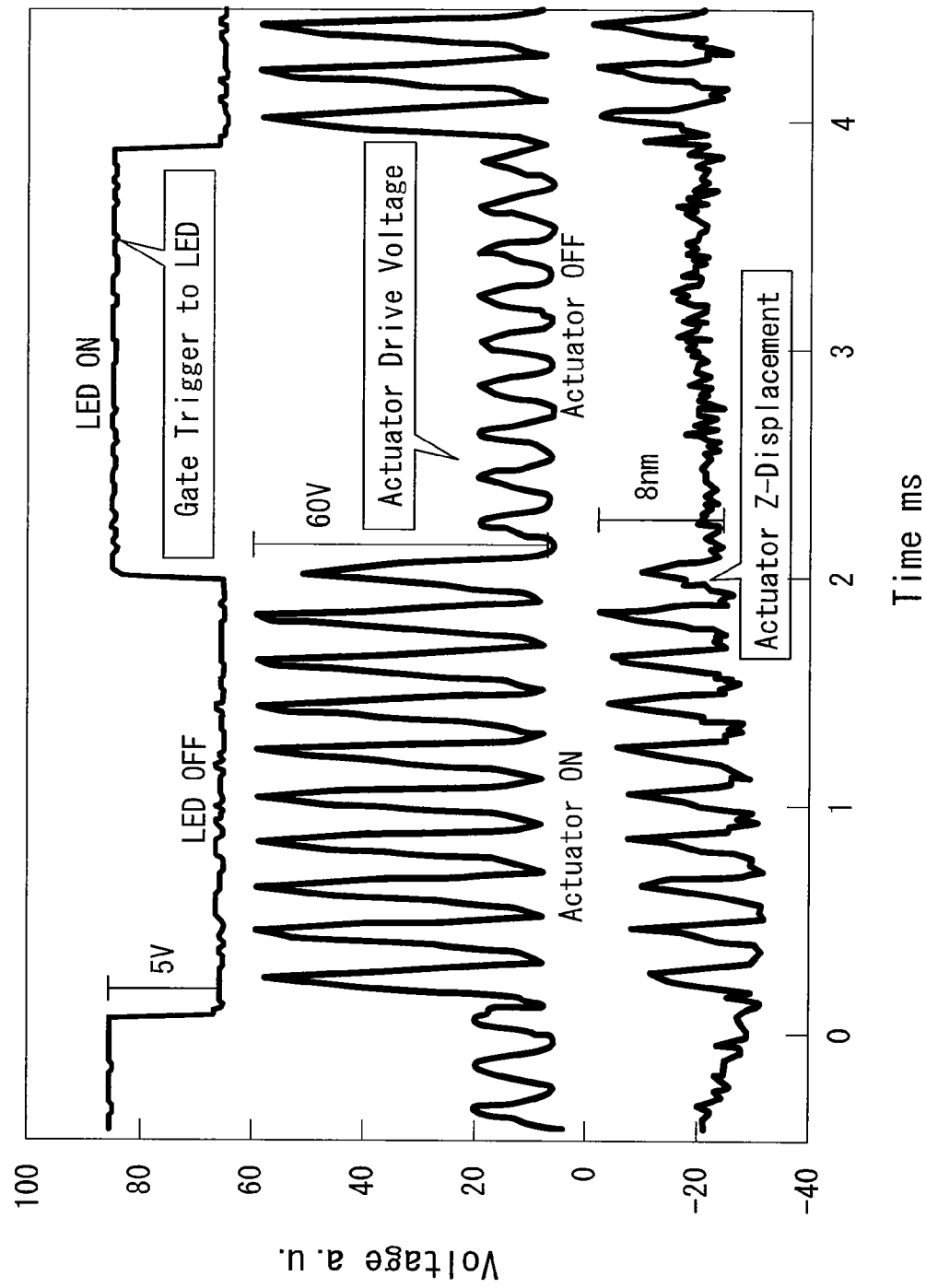
FIG. 13 is a wave figure showing both a voltage wave of each portion of an equivalent circuit during the experiment for confirming the theory by using the circuit shown in FIG. 12 and a displacement wave of the movable structure portion of the electrostatic microactuator.
Figure 14A:
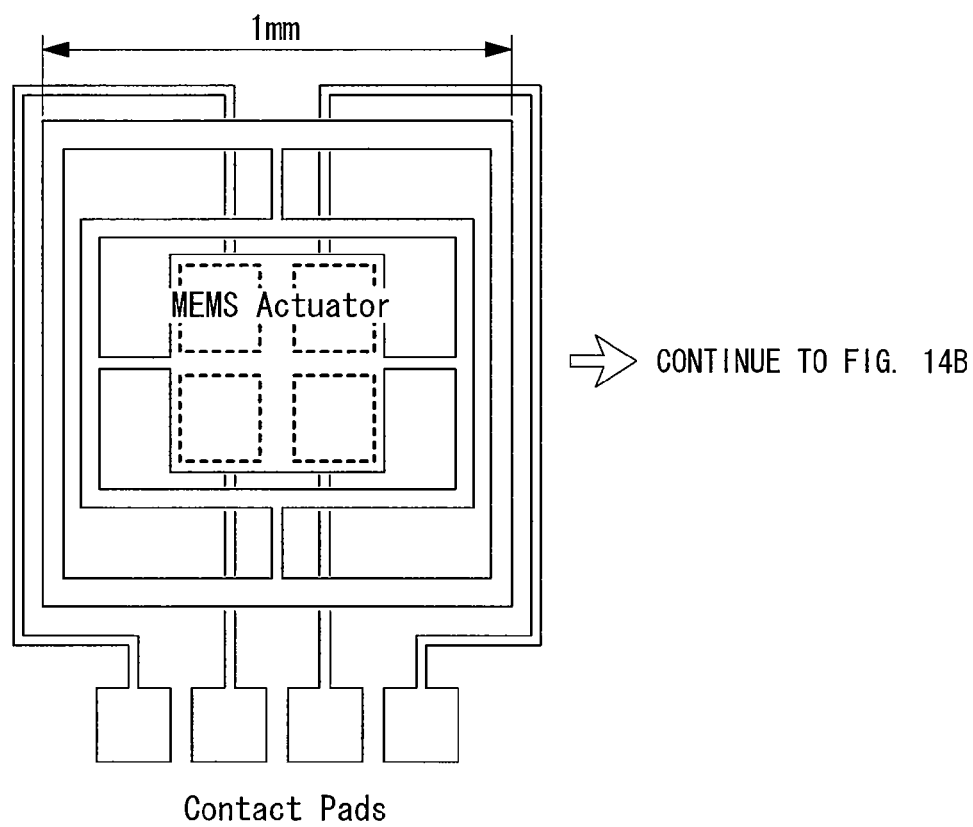
FIG. 14A is an explanation figure showing a tendency in which an area shared by electrical wiring increases along with refining on a MEMS structure.
Figure 14B:
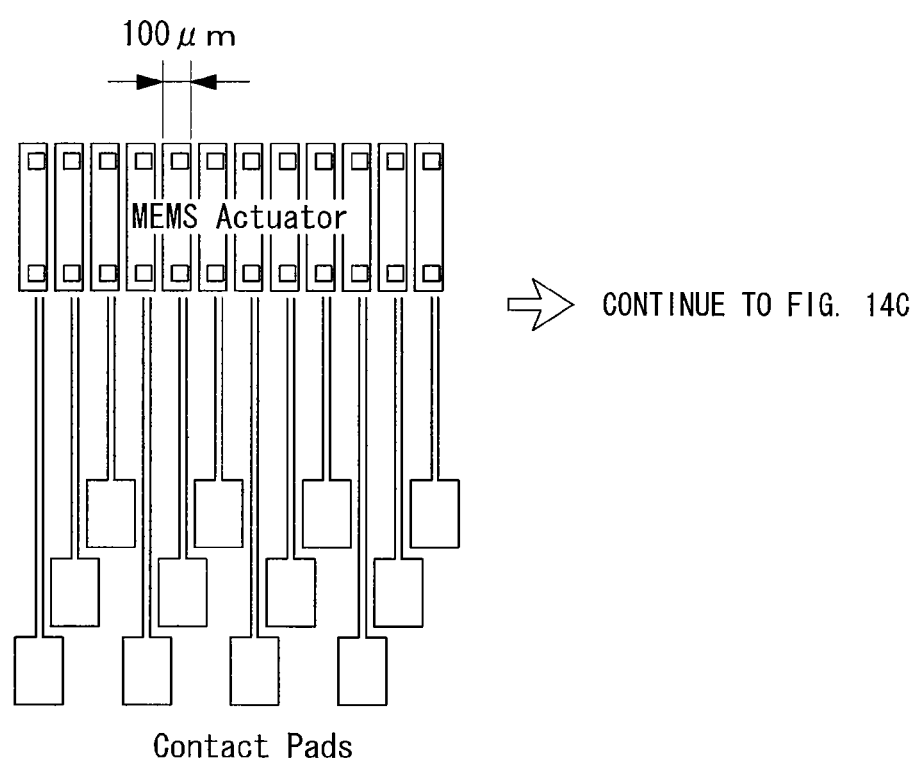
FIG. 14B is an explanation figure showing a tendency in which an area shared by electrical wiring increases along with refining on a MEMS structure.
Figure 14C:
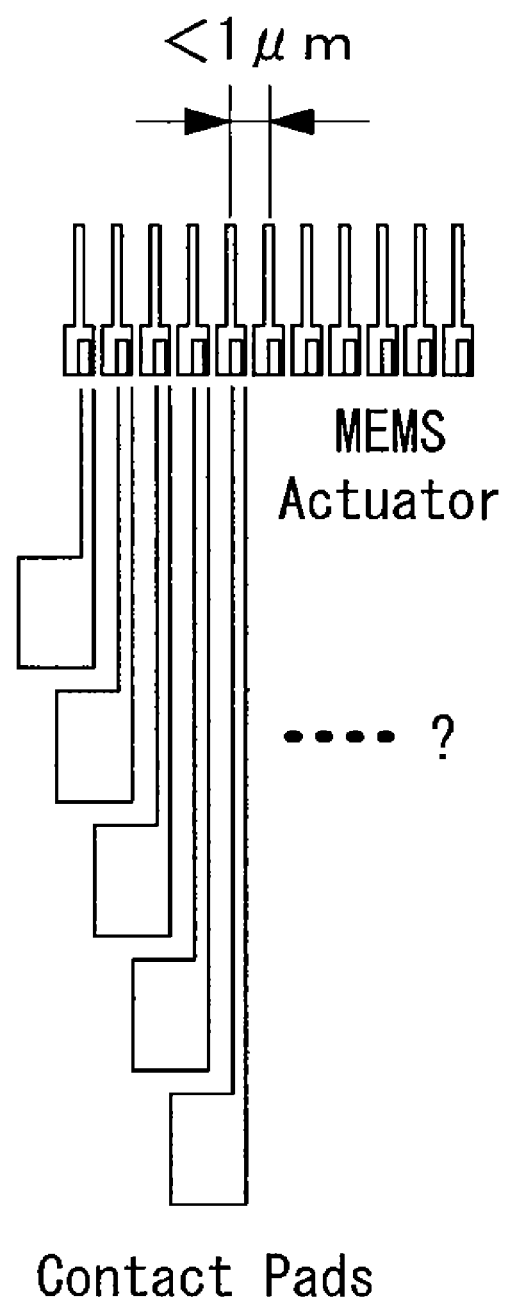
FIG. 14C is an explanation figure showing a tendency in which an area shared by electrical wiring increases along with refining on a MEMS structure.

In FIG. 13, both voltage waveforms of portions of the equivalent circuit and displacement waveforms of the MEMS during the experiment for verifying the principle are shown. When a driving voltage (upper waveform) applied to LED is 0V, no photocurrent flows at the photodiode PD. Therefore, the driving voltage (middle) is applied from the amplifier A to the actuator (capacitance) at a constant voltage and is measured as a displacement of approximately 8 nm. On the other hand, when the driving voltage applied to the LED is 5V, the light is radiated on the photodiode PD. Therefore, a voltage drop occurs at the resistance R because the photocurrent flows. Therefore, it was observed that the voltage applied to the actuator dropped and activation of the actuator stopped.

As described above, in accordance with the electrostatic microactuator of the second embodiment of the present invention, the voltage applied to the capacitance constituted from both the elastic mechanical structure and the semiconductor substrate is controlled by using outside light from the outside into the photodiode provided at a portion of the elastic mechanical structure, and the mechanical displacement of the elastic mechanical structure which is a movable structure portion of the electrostatic microactuator is controlled in accordance with the voltage changes. Therefore, it is possible for an user to set the driving voltage as high as he or she wants, and therefore, compared to conventional cases in which means such as a laser micro manipulation, a light-heat conversion, or the like is applied, it is possible to make the generated power larger.

Moreover, it is controlled by using the light. Therefore, it is possible to achieve a non-contact drive. Furthermore, even when multiple electrostatic microactuators are provided on the same substrate, the common power source and the common ground connection are sufficient as the electrical wiring.

Therefore, there is a special advantageous effect in which the electrical wiring are significantly simple. It is possible to produce a mechanical structure portion (the semiconductor substrate and the elastic mechanical structure portion) of the electrostatic microactuator by using an SOI (Silicon-On-Insulator) substrate. Therefore, it is possible to increase the photoelectric conversion efficiency of the photodiode provided on the substrate and to increase the dielectric strength of the photodiode.

It should be noted that, with respect to the above-described electrostatic microactuator, even when the polarity of the photodiode, that is, a direction of the PN junction, is formed so as to be opposite the electrostatic microactuators of the embodiments of the present invention because the semiconductor production processes or p-type/n-type of the semiconductor substrate is reversely applied, it is possible to achieve the same activation as the embodiments of the present invention by applying the power source after arranging its positive and negative polarities in reverse.

With respect to the photodiode of the electrostatic microactuator of the embodiments of the present invention, other than PN junction, when PIN junction in which an intrinsic layer is bound between the p-type semiconductor and the n-type semiconductor is applied, operations of the electrostatic microactuator are the same except for increased characteristics of the photodiode.

INDUSTRIAL APPLICABILITY

In accordance with the present invention, in the case in which multiple electrostatic microactuators are provided on a single substrate, by using the light/beam (multiple) which propagates in a free space for relatively driving the fine mechanical structure (elastic mechanical structure), it is possible to avoid spatial congestion of the electrical wiring and to independently control a displacement of the fine mechanical structure.

The invention claimed is:

1. An electrostatic microactuator comprising:
   a capacitance, including
      a semiconductor substrate;
      an elastic mechanical structure having a first portion anchored directly on the semiconductor substrate and a second portion facing the semiconductor substrate and distanced from the semiconductor substrate so as to form an air layer therebetween, the elastic mechanical structure being made from an electrically conductive material or a semiconductor material, and the elastic mechanical structure being mechanically movable;
   a photodiode which is connected in series or in parallel to the capacitance, the photodiode being formed on the first portion of the elastic mechanical structure or between the first portion of the elastic mechanical structure and the semiconductor substrate; and
   a power source connected to the first portion of the elastic mechanical structure via a resistance and operable to supply voltage to apply backward bias to a side of the elastic mechanical structure at which the capacitance is connected to the photodiode.

2. A driving method of an electrostatic microactuator, in which the electrostatic microactuator includes:
   a capacitance including a semiconductor substrate and an elastic mechanical structure which is arranged on the semiconductor substrate so as to face the semiconductor substrate, the elastic mechanical structure being made from an electrically conductive material or a semiconductor material and the elastic mechanical structure being mechanically movable;
   a photodiode which is connected to the capacitance in series or in parallel, is the photodiode being formed on a portion of the elastic mechanical structure or between a portion of the elastic mechanical structure and the semiconductor substrate, the driving method comprising:
   anchoring the portion of the elastic mechanical structure at which the photodiode is formed directly to the semiconductor substrate;
   mechanically displacing the elastic mechanical structure by changing a voltage applied to the capacitance; and
   controlling the mechanical displacement of the elastic mechanical structure by controlling the voltage applied to the capacitance depending on at least one of existence of an outside light and an amount of the outside light.

3. An electrostatic microactuator comprising:
   a capacitance, including
      a semiconductor substrate;
      an elastic mechanical structure having a first portion anchored directly on the semiconductor substrate and a second portion facing the semiconductor substrate and distanced from the semiconductor substrate so as to form an air layer therebetween, the elastic mechanical structure being made from an electrically conductive material or a semiconductor material, and the elastic mechanical structure being mechanically movable;
   a photodiode which is connected in series to the capacitance, the photodiode being formed on the first portion of the elastic mechanical structure; and
   a power source connected to the first portion of the elastic mechanical structure via a resistance and operable to supply voltage to apply backward bias to a side of the elastic mechanical structure at which the capacitance is connected to the photodiode.

* * * * *

UNITED STATES PATENT AND TRADEMARK OFFICE
CERTIFICATE OF CORRECTION

PATENT NO. : 7,825,755 B2
APPLICATION NO. : 11/577965
DATED : November 2, 2010
INVENTOR(S) : Hiroshi Toshiyoshi et al.

It is certified that error appears in the above-identified patent and that said Letters Patent is hereby corrected as shown below:

Title Page, Item (30) should be inserted to read

-- (30) Foreign Application Priority Data

October 29, 2004 [JP] Japan .................. 2004-316082 --

Signed and Sealed this
Twenty-ninth Day of November, 2011

David J. Kappos
*Director of the United States Patent and Trademark Office*